No. 715,397. Patented Dec. 9, 1902.
A. W. LIVINGSTON.
CAN SEALING DEVICE.
(Application filed Oct. 28, 1901.)
(No Model.)

Witnesses,
E. A. Branday
J. H. Towse

Inventor,
Andrew W. Livingston
By Dewey Strong & Co.
Attys.

THE NORRIS PETERS CO., PHOTO-LITHO., WASHINGTON, D. C.

UNITED STATES PATENT OFFICE.

ANDREW WILLIAM LIVINGSTON, OF ALAMEDA, CALIFORNIA.

CAN-SEALING DEVICE.

SPECIFICATION forming part of Letters Patent No. 715,397, dated December 9, 1902.

Application filed October 28, 1901. Serial No. 80,262. (No model.)

*To all whom it may concern:*

Be it known that I, ANDREW WILLIAM LIVINGSTON, a citizen of the United States, residing at Alameda, county of Alameda, State of California, have invented an Improvement in Can-Sealing Devices; and I hereby declare the following to be a full, clear, and exact description of the same.

My invention relates to a device for the hermetical sealing of containing-cans without the use of solder.

It consists of the construction and arrangement of parts which I will hereinafter describe and claim.

The hermetical sealing of cans containing food products of any character when effected by the use of molten solder is objectionable on account of the acid or other flux used to promote the free flowing of the solder and which is liable to contaminate the contents of the can and also on account of the heat necessary to melt the solder and cause it to flow properly. Various sealing mediums have been employed as substitutes for solder.

It is the object of my invention to provide a vehicle by which any such medium is readily applied to and retained upon the parts to be sealed together, and this vehicle by its quality and flexibility assists in forming a tight joint.

The accompanying drawings illustrate the application of my invention.

Figure 1:
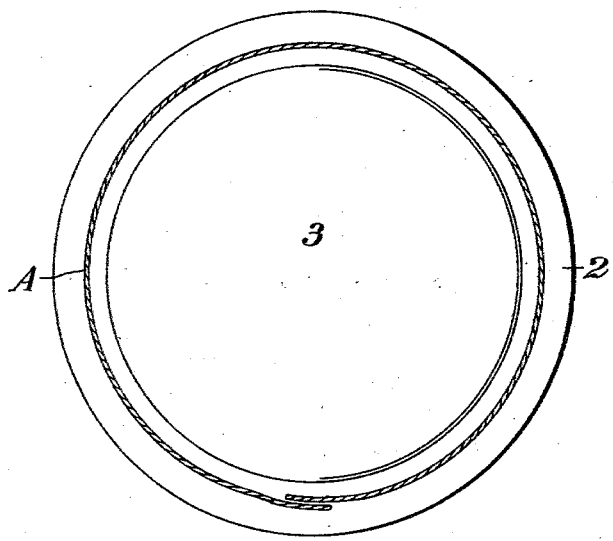
Figure 2:
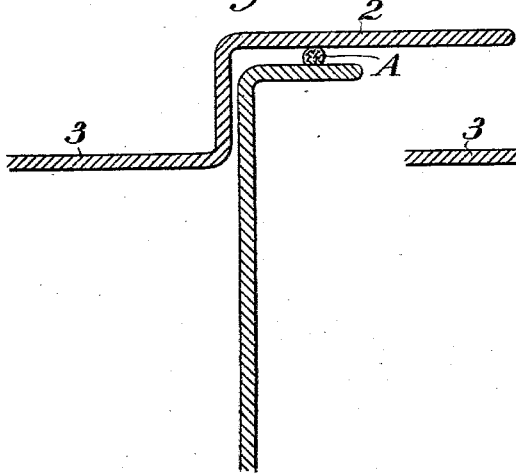
Figure 3:
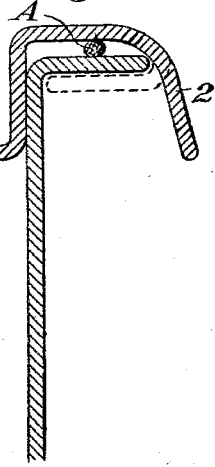
Figure 4:
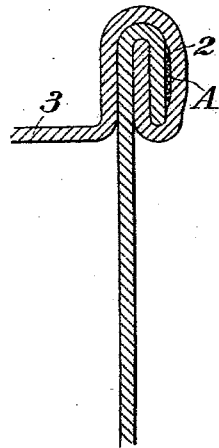

Figure 1 is a plan of the bottom part of a can-cover, showing the application of my invention. Fig. 2 is a greatly-exaggerated section of a part of can cover and body, showing the application of the sealing medium. Fig. 3 is a similar view, but showing the cover-flange bent over. Fig. 4 is a similar view illustrating the final operation.

It has been customary to use various forms of rubber, gutta-percha, gum guaiac, or other gums made of the proper consistency, and these gums are applied to one of the parts to be secured together, as the cover of a can, and the flange of the cover and that of the can are then double-seamed together, compressing them, so that the gum is intended to hermetically seal the joint thus formed.

In my invention I employ a vehicle A, which may be in the form of a flexible thread of fibrous material—such as cotton, linen, or equivalent threads—and this thread is first saturated or coated with a suitable sealing gum or material and is then applied to the flange of one of the parts to be united, and the parts are afterward sealed and pressed together in the usual manner of forming such joints. This vehicle is permanently attached and has sufficient thickness to render the same capable of being compressed and flattened transversely to form a relatively wide flat packing when the seam is closed.

In the present illustration I have shown the thread A as applied to the flange 2 of a cap or cover 3. These covers are usually stamped out flat, with an annular rim adapted to fit the top of the can and a flange projecting beyond and coincident with a similar flange upon the can, so that when the two are brought together the sealing device is compressed between them by the subsequent double-seaming or interlocking of these flanges inclosing the can. I prefer to saturate or coat the thread or fiber by passing it through the compound or solution of the sealing material and afterward applying it to one of the parts, as the cover-flange, in the form of a ring which is sufficiently adherent to the flange to remain in position while the cover is being secured and the joint forming. The thread or filament may be passed through the sealing medium by drawing it off from the spool upon which it is wound, passing it down into a receptacle containing the medium and guiding it by means of a submerged roller, thence bringing it out at the top of the receptacle and, if desirable, passing it between rollers or scrapers, which will clear it of any surplus, leaving sufficient of the medium adherent to it to insure the formation of a perfect joint. Any suitable device may be used; but I do not desire to limit myself to any particular means for applying the medium to the filament. Any suitable mechanism not here described may be employed for applying the filament thus coated to the can-head or part to which it is to be attached, and when cooled or set it will adhere thereto, the ends being suitably overlapped. As these can-heads may be prepared in this manner in large numbers, it may be found desirable in order to prevent the filament from being detached by friction or rubbing to protect it by partially turning the flange 2 of the can-head, as shown in Fig. 3, and placing the prepared filament in the channel thus formed. The can-heads thus prepared may be then placed in barrels or boxes in any number in readiness for use without danger of disturbing the filaments. By this means I first provide a vehicle to carry and apply the sealing material which by its cohesion retains the sealing material or packing in any desired position. Being elastic and compressible, it in itself forms a packing which, in conjunction with the medium employed, insures a tight joint when the seam is formed. It also prevents the packing material from being broken and displaced if it should be in any way hard or brittle.

Having thus described my invention, what I claim, and desire to secure by Letters Patent, is—

A can head or cover consisting of a central body, a peripheral flange and permanently-attached flexible cement-coated filament, said filament having a fibrous body of sufficient thickness to render the same capable of being compressed and flattened transversely to form a relatively wide flat packing when the seam is closed thereon.

In witness whereof I have hereunto set my hand.

ANDREW WILLIAM LIVINGSTON.

Witnesses:
S. H. NOURSE,
JESSIE C. BRODIE.